United States Patent [19]

Arcella et al.

[11] Patent Number: 5,093,400

[45] Date of Patent: Mar. 3, 1992

[54] ADDITIVES COADJUVATING THE DETACHING FROM THE MOLDS OF RUBBERS VULCANIZABLE BY MEANS OF PEROXIDES

[75] Inventors: Vincenzo Arcella, Novara; Giulio Brinati, Milan; Franco Barbieri, Spinetta Marengo, all of Italy

[73] Assignee: Ausimont S.r.l., Milan, Italy

[21] Appl. No.: 453,174

[22] Filed: Dec. 26, 1989

Related U.S. Application Data

[63] Continuation of Ser. No. 250,546, Sep. 29, 1988, abandoned.

[30] Foreign Application Priority Data

Oct. 2, 1987 [IT] Italy .............................. 22110 A/87

[51] Int. Cl.⁵ ................................................ C08K 5/06
[52] U.S. Cl. .................................. 524/366; 524/520; 525/199
[58] Field of Search ................. 524/366, 520; 525/199

[56] References Cited

U.S. PATENT DOCUMENTS 3,019,206  1/1962  Robb .
3,484,503  12/1969  Magner et al. ....................... 525/199
4,789,717  12/1988  Gianetti et al. ...................... 526/209

FOREIGN PATENT DOCUMENTS 222201  5/1987  European Pat. Off. .
1694508  4/1971  Fed. Rep. of Germany .

*Primary Examiner*—Paul R. Michl
*Assistant Examiner*—John J. Guarriello
*Attorney, Agent, or Firm*—Morgan & Finnegan

[57] ABSTRACT

Use of perfluoropolyethers having perfluoroalkyl end groups with a molecular weight ranging from 500 to 1500, in amounts from 0.5 to 3 parts by weight per 100 parts by weight of elastomer and, optimally, in combination wit polytetrafluoroethylene having a molecular weight lower than about 200,000, as additives to the polymerization latex of rubbers vulcanizable by means of peroxides in order to improve the detachability of the vulcanizate from forming molds.

10 Claims, No Drawings

ADDITIVES COADJUVATING THE DETACHING FROM THE MOLDS OF RUBBERS VULCANIZABLE BY MEANS OF PEROXIDES

This application is a continuation of application Ser. No. 250,546, filed Sept. 29, 1988.

DESCRIPTION OF THE INVENTION

This invention provides rubber vulcanizable by means of peroxides and endowed with improved processability properties considered in terms of better extrudability and better detachability of the vulcanizate from the forming molds utilized in injection molding or compression molding techniques.

The invention is based on the use, as additives, of products belonging to the class of the perfluoropolyethers having an average molecular weight ranging from 500 to about 1,500, said perfluoropolyethers consisting of a sequence of one or more of the following oxyperfluoroalkylene units:

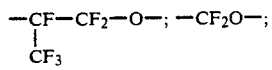

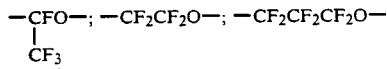

having perfluoroalkyl end groups, and in particular being comprised in the following general formulas:

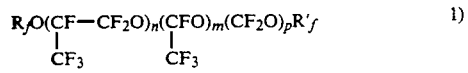

with random distribution of the perfluorooxyalkylene units, where $R_f$ and $R'_f$, alike or different from each other, are $-CF_3$, $-C_2F_5$, $-C_3F_7$, $-CF_2H$, and m, n, p have such average values as to comply with the above-said average molecular weight characteristics;

2) $R_fO(CF_2CF_2O)_n(CF_2O)_m R'_f$ with a random distribution of the perfluorooxyalkylene units, where $R_f$ and $R'_f$, alike or different from each other, are $-CF_3$ or $-C_2F_5$, and m and n have such values as to comply with the above average molecular weight characteristics;

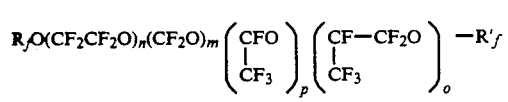

where $R_f$ and $R'_f$ are as defined above in class 1), and m, n, p, o have such values as to comply with the above average molecular weight characteristics;

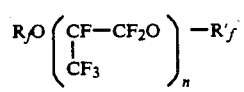

where $R_f$ or $R'_f$, alike or different from each other, are $-C_2F_5$ or $-C_3F_7$, and n has such a value as to comply with the above average molecular weight characteristics;

5) $R_fO(CF_2CF_2O)_n R'_f$ where $R_f$ and $R'_f$, alike or different from each other, are $-CF_3$, $-C_2F_5$, and n has such an average value as to comply with the above average molecular weight characteristics;

6) $R_fO(CF_2CF_2O)_n R'_f$ where $R_f$ and $R'_f$, alike or different from each other, are $-CF_3$ or $-C_2F_5$ or $-C_3F_7$, and n has such an average value as to comply with the above average molecular weight characteristics.

Perfluoropolyethers of class (1) are marketed under the trade-mark Fomblin ®Y or Galden ® and those of class (2) under the trademark Fomblin ®Z, all produced by Montedison. Products of class (4) are marketed under the trade-mark Krytox ® (DuPont).

The products of class (5) are described in U.S. Pat. No. 4,523,039; and those of class (6) are described in European patent EP No. 148,482 to Daikin.

The products of class (3) are prepared according to U.S. Pat. No. 3,665,041. Also the perfluoropolyethers described in U.S. Pat. No. 4,523,039 or in J. Am. Chem, Soc. 1985, 107, 1195-1201 are suitable.

According to another aspect of the present invention, non-fibrillable PTFE, polymerized in a water dispersion, is utilizable as an additive, either alone or in admixture with the above-described perfluoropolyethers, said PTFE being characterized by a crystallization ΔH higher than 9 cal/g, and preferably higher than 13 cal/g. The crystallization ΔH values are obtained by differential calorimetry. The corresponding molecular weight values were calculated according to the empirical equation:

$$M.W. = (2.1 \times 10^{10})(\Delta H^{-5.16}).$$

The perfluoropolyether-type additives according to the present invention are dispersed in the elastomer polymerization latex by gentle stirring, for example a mechanical stirring, or they are utilized in the form of thermodynamically stable microemulsions which are dispersed in the polymerization latex by simple mixing.

Subsequently, the additives dispersed in the latex are co-coagulated according to the techniques which are known to those skilled in the art, and the resulting polymeric product is additioned with a peroxy vulcanizing system or with a mixed peroxy-ionic vulcanizing system, thus obtaining a blend having improved processability characteristics.

It is known that vulcanizing systems based on peroxides are capable of vulcanizing many types of rubbers, imparting to the vulcanizates excellent properties of stability to heat, to mechanical agents, and to mechanical stresses.

The rubber blends vulcanizable with peroxides, which are known in the art, are generally composed of the following ingredients:

Rubber

As elastomers vulcanizable with peroxides the following types can be cited: natural rubber, ethylene/propylene/diene copolymers, butadiene/styrene rubber, butadiene/acrylonitrile rubber, silicone rubber, fluorosilicone rubber, fluoroelastomers containing peroxy cure sites, blends of rubbers of which at least one is vulcanizable by means of peroxides or by means of mixed vulcanization systems, in particular blends of fluoroelastomer based on $CH_2=CF_2$ and of an elastomeric $C_2F_4/C_3H_6$ copolymer, such as AFLAS ®.

Peroxy starter (vulcanizing) agent

This consisted of an organic peroxide, such as e.g.: benzoyl peroxide, dicumyl peroxide, 2,5-dimethyl-2,5-di(t.butyl-peroxy)-hexane, alpha,alpha'-bis(t.butyl-peroxy)diisopropyl-benzene, and aliphatic or cyclic bisperoxycarbamates.

Vulcanizing co-agent

This consists of an unsaturated di- or tri-functional compound such as, for example, triallylcyanurate, triallylisocyanurate, divinylbenzene, and m.phenylenebis(maleimide).

Reinforcing fillers

Carbon black, silica, etc.

Acidity acceptors such as, for example, lead-, zinc-, calcium-, and magnesium-oxides.

Processing coadjuvants

These are products endowed with plasticizing or lubricating properties, such as e.g., vegetable waxes, low molecular weight polyethylenes, various stearates, polyesters, octadecylamines, etc.

The use of such coadjuvants is required owing to the poor extrudability characteristics of the blends and to the phenomena of adhesion to the molds and of fouling of same.

The known processing coadjuvants sometimes give rise to problems of interference with the peroxy vulcanizing system and of bad surface appearance of the molded article. Furthermore, in the specific case of fluoroelastomers, a "thermal stabilization" (post-vulcanization) at temperatures ranging from 200° to 250° C. for a time from 10 to 30 hours is absolutely necessary in order to impart to said fluoroelastomers the well-known properties of resistance to heat, to chemical agents, and to solvents. During this step, the usual plasticizing agents (glycols, stearates, organic phosphates, oleates, phthalates, etc.) volatilize and/or decompose This fact causes a marked degradation of the mechanical properties of the final articles, in particular:

excessive increase in hardness;

decay of the resistance to compression set;

decay of the elastic properties (low elongation value and high modulus value); and low thermal stability, which precludes the utilization of the articles under severe applicative conditions (>180° C.).

In conclusion, the benefits attainable in the processing step result in unacceptable shortcomings of the final articles.

Therefore the use of plasticizers and lubricants is limited to small amounts (1-3 p.h.r.), which do not sensibly alter the final properties of the vulcanizates, but which, on the other hand, are insufficient to meet the abovesaid requirements.

In particular, it has been observed that the use of perfluorosilicone oils permits one to lower the hardness by 4-5 points, but nevertheless, some difficulties arise as regards the mixing and incorporation into the fluoroelastomer. Furthermore, a decrease in the vulcanization rate and a worsening of the compression-set and of the stability to heat have been encountered.

The use of fluorinated polymers having a very low molecular weight and the consistency of waxes, such as Viton LM produced by DuPont, was adopted in order to impart better theological characteristics to the blends, in particular during the extrusion. Thus it is possible to obtain extruded articles of large dimensions and with a complex profile. However, the use of such a "plasticizer," in an amount of 10-20 parts by weight for 100 parts of fluoroelastomer, is possible only with conventional vulcanizing systems, while it is not consistent with the use of vulcanizing systems based on peroxides. This results in a worsening of the resistance to heat, to chemical agents, to solvents, and to oils, as well as in a decrease in the compression-set values.

Italian patent application No. 22532 A/85 describes the use of perfluoropolyethers having brominated end groups dispersed as additives in the mixtures of fluoroelastomers with the peroxy vulcanizing systems or with mixed peroxy and ionic vulcanizing systems in order to solve the problems relating to processability during extrusion and to the detaching of the vulcanizate from the molds.

Said perfluoropolyethers having a brominated end group improve the processability in terms of yield and appearance of the extrudate, and promote a good detachability from the mold, but make difficult the preparation of the composition, namely of the addition polymer comprising the perfluoropolyether and the vulcanization ingredients, due to incompatability between the polymer and the perfluoropolyether, thus rendering the calendering step very difficult, and requiring such long times as to penalize any commercial-scale utilization thereof.

It has now, surprisingly, been discovered that by adding to the elastomer polymerization latex the perfluoropolyethers belonging to the above-described classes and having a molecular weight lower than about 1,500, and preferably ranging from 500 to 1,000, in amounts ranging from 0.5 to 3 p.h.r., it is possible to obtain an excellent detachability of the vulcanizate from the mold and at the same time an improved and easier preparation of the composition, with consequent lowering of the calendering step times, thus permitting a more favorable commercial-scale utilization.

The dispersion of the additive in the polymerization latex through mechanical mixing and subsequent co-coagulation permits one to obtain a better homogeneity of the dispersion.

Subsequently to the molding or extrusion step, the perfluoropolyether uniformly distributed in the mass homogeneously migrates on the entire surface of the manufactured article, thereby forming an inert lubricating substance which prevents interactions between the mold and the vulcanizing material. An excellent detachability of the vulcanizate from the mold is thus obtained, and the flow conditions in the case of extrusion processing are substantially improved.

The perfluoropolyether additives may be added in any manner to the polymerization latex, but it has been discovered that the use of the perfluoropolyether additive in the form of an aqueous microemulsion is particularly advantageous.

The microemulsions are thermodynamically stable systems in a certain temperature range and they form by mixing of the components at a temperature within the stability range without having to supply the system with a considerable dispersion mechanical energy, as happens in the case of conventional microemulsions.

Microemulsions of perfluoropolyethers are known, for example, from Italian patent application Nos. 20910 A/86, 19494 A/87 and 20256 A/86, and they are prepared simply by mixing perfluoropolyether in water in the presence of proper amounts of a preferably perfluorinated surfactant and of an alkanol.

The addition of the perfluoropolyether additives, in the form of an aqueous microemulsion, to the polymerization latex permits one to add greater amounts of additive to the latex itself and, in consequence, to obtain a maximum effect of detachability from the mold.

The polytetrafluoroethylene used as additive in the present invention is characterized by a crystalization $\Delta H > 9$ cal/gram, and preferably $> 13$ cal/gram, as mentioned above. This property corresponds to a relatively low molecular weight, lower than about 200,000.

The polytetrafluoroethylene to be added to the elastomer latex according to the present invention is prepared by polymerization in aqueous dispersion as in conventional methods, by using a high concentration of free radical catalyst, for example ammonium persulphate.

It has been discovered that this particular type of polytetrafluoroethylene is capable of providing, also in the absence of perfluoropolyether, a good detachability, while the commercial type of high molecular weight PTFE does not at all improve the detachability of the vulcanizate from the mold.

The polytetrafluoroethylene may be added to the polymerization latex in amounts ranging from 1 p.h.r. to 10 p.h.r.

A preferred embodiment of the invention consists in using both type of additives (perfluoropolyether and polytetrafluoroethylene) in the polymerization latex, which leads to the best results as regards detachability of the vulcanizate from the mold, thanks to the synergistic action of the two additives.

The use of the additives according to this invention is particularly suitable for fluoroelastomers in general, such as for example the copolymers of $CH_2=CF_2$ with $C_3F_6$ or with $C_3F_6+C_2F_4$ and containing peroxy cure sites; the copolymers of $C_2F_4$ with propylene or with perfluoroalkylperfluorovinylethers (in particular methylvinylether) containing, in the latter case, a cure site peroxy monomer; terpolymers of $C_3F_6$, vinylidene fluoride and perfluoroalkylperfluorovinylethers (in particular methylvinylether) containing a cure site peroxy monomer.

The following examples are given merely to illustrate various embodiments of the invention, but without limiting same. Parts are by weight unless otherwise indicated.

EXAMPLES 1-8

By means of the actual mixing techniques, rubber blends containing the ingredients indicated below in Table 1 are prepared. Using the blends so prepared, the tests and measurements indicated in said Table 1 were carried out.

A polymer was prepared from monomers consisting of $CH_2CF_2$ (65 parts), $C_3F_6$ (19 parts), $C_2F_4$ (16 parts) and bromoethylvinylether (0.6 parts), having a Mooney viscosity ML (1+4) at 100° C. equal to 102.

The various additives reported in Table 1 and described below were added to the elastomer polymerization latex and co-coagulated according to per se conventional techniques.

In particular, after addition of the additives, the resulting latex was coagulated with a water solution containing 6 g/l of $Al_2(SO_4)_3.8H_2O$ under stirring, and then the coagulated product was filtered and washed with demineralized water. The polymer so coagulated was dried in an oven.

ADDITIVE 1

Perfluoropolyether of class (1) having a molecular weight equal to 800 (Galden LS ®) was added to the elastomer polymerization latex described in Table 1 at a temperature of 20° C. in the liquid phase under stirring.

ADDITIVE 2

10 cc of an acid having the perfluoropolyether structure of the above defined class 1), having monocarboxylic functionality ($R_f \neq R'_f = COOH$) containing only small amounts of dicarboxylic acid ($R'_f = R_f = COOH$), consisting of a mixture of components having different molecular weights and with an average equivalent molecular weight equal to 570, were neutralized with 11 ml of an ammonia/water ½ solution and were added to 30 ml of doubly distilled water after addition of 11 ml of $HNO_3$ 1M.

To the surfactant solution so obtained there were added, under gentle stirring, 5 ml of an alcohol having the perfluoropolyether structure of class 1) with an average equivalent weight equal to 690, essentially consisting of monoalcohol ($R'_f \neq R_f = -CH_2OH$) and containing only small amounts of divalent alcohol ($R'_f = R_f = -CH_2OH$), and then 20 ml of perfluoropolyether belonging to class 1), consisting of a mixture of components having different molecular weights and with an average molecular weight equal to 800. The resulting microemulsion was characterized by the following properties: it was a limpid, transparent liquid having a stability range of 35° to 45° C.

Said microemulsion was added to the elastomer polymerization latex described in Table 1; the values are referred to the amount of neutral perfluoropolyether contained in the microemulsion.

ADDITIVE 3

Into a stirrer-reactor having a 50-liter volume there were charged 30 l of water, 12 g of perfluorooctanoate, and 5 g of ammonium persulphate.

Tetrafluoroethylene was continuously added and polymerized in dispersion at a temperature of 95° C. and at a pressure of 20 atm. After 15 minutes a product was discharged which exhibited a conversion of 100 g of polymer per liter of latex.

The PTFE so produced was characterised by a crystallization $\Delta H$ higher than 13 cal/mole and an average molecular weight of about 40,000.

Additive 4 (check)

Commercial type PTFE (DF1 ®, Montefluos) characterized by a molecular weight of about 800,000.

Detachability Tests

The blend was vulcanized in a press at 170° C. for 10 minutes and the piece was withdrawn from the mold at a temperature of 170° C.

Fouling of the molds was evaluated in a 7-circular impression mold (diameter=40 mm, height 3 mm) by repeating the moldings of all the blends being tested until appearance differences were observed on the bottom surface of the circular cavities in the form of blueings, or darker opalescenses.

80 moldings were carried out for each blend with the following evaluation scale:

10. If after 80 moldings no blueings were present.

9. If after 70 moldings blueings were present.
8. If after 62 moldings blueings were present.
7. If after 55 moldings blueings were present.
6. If after 49 moldings blueings were present.
5. If after 42 moldings blueings were present.
4. If after 35 moldings blueings were present.
3. If after 28 moldings blueings were present.
2. If after 21 moldings blueings were present.
1. If after 14 moldings blueings were present.
0. If after 7 moldings blueings were present.

The characteristics of the obtained vulcanizate were determined on test pieces prepared by vulcanization in a mold at 170° C. for 10 minutes and by subsequent post-vulcanization in oven at 250° C. for 24 hours, the post-vulcanization being preceded by a thermal rise from 100° C. to 250° C. in 8 hours.

From the examples of Table 1 it is apparent that additive 4 (high molecular weight PTFE) does not impart to the vulcanizate a good detachability from the mold, while the optimum detachability is obtained by using the perfluoropolyether in the form of a microemulsion combined with low molecular weight PTFE and added to the elastomer polymerization latex.

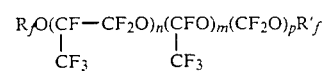

with a random distribution of the perfluorooxyalkylene units, where $R_f$ and $R'_f$ alike or different from each other, are $-CF_3$, $-C_2F_5$, $-C_3F_7$, $-CF_2H$, and m, n, p have such average values as to meet the above average molecular weight requirements, 2) $R_fO(CF_2CF_2O)_n(CF_2O)_mR'_f$, with a random distribution of the perfluorooxyalkylene units, where $R_f$ and $R'_f$ alike or different from each other, are $-CF_3$ or $-C_2F_5$, and m and n have such values as to meet the above average molecular weight requirements;

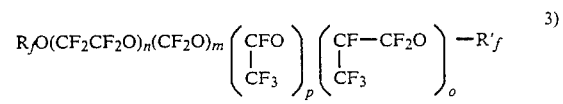

TABLE 1

| EXAMPLE | | 1 | 2 | 3 | 4 | 5 | 6 | 7 | 8 |
|---|---|---|---|---|---|---|---|---|---|
| ELASTOMER | P.H.R. | 100 | 100 | 100 | 100 | 100 | 100 | 100 | 100 |
| ADDITIVE 1 | " | — | 0.5 | 1 | — | — | — | — | — |
| ADDITIVE 2 | " | — | — | — | 0.5 | 1 | — | 1 | — |
| ADDITIVE 3 | " | — | — | — | — | — | 1 | 1 | — |
| ADDITIVE 4 | " | — | — | — | — | — | — | — | 1 |
| PbO | " | 3 | 3 | 3 | 3 | 3 | 3 | 3 | 3 |
| NBERO MT | " | 30 | 30 | 30 | 30 | 30 | 30 | 30 | 30 |
| LUPERCO 101XL ® | " | 3 | 3 | 3 | 3 | 3 | 3 | 3 | 3 |
| TAIC | " | 3 | 3 | 3 | 3 | 3 | 3 | 3 | 3 |
| ML (1 + 4) MATRIX 100° C. | | 102 | 104 | 103 | 105 | 104 | 102 | 105 | 108 |
| ML (1 + 10) MATRIX 121° C. | | 64 | 64 | 65 | 67 | 66 | 65 | 68 | 70 |
| ODR 180° C., 5° arc | | | | | | | | | |
| ML (lb. m) | | 29 | 29 | 29 | 32 | 30 | 29 | 31 | 31 |
| ts 10 (min. sec.) | | 1'21" | 1'18" | 1'24" | 1'22" | 1'20" | 1'21" | 1'19" | 1'22" |
| ts 50 (min. sec.) | | 1'57" | 1'54" | 2'02" | 2'03" | 2'00" | 1'59" | 2'00" | 2'03" |
| MH 6' (lb. m) | | 122 | 118 | 118 | 113 | 117 | 120 | 115 | 115 |
| MODULUS 100% (kg/cm²) | | 41 | 44 | 41 | 43 | 44 | 43 | 44 | 41 |
| TENSILE strength (kg/cm²) | | 125 | 135 | 122 | 130 | 128 | 138 | 135 | 133 |
| ELONGATION (%) | | 243 | 256 | 239 | 240 | 241 | 244 | 256 | 252 |
| MOULD FOULING | | 4 | 6 | 7 | 7 | 8 | 6 | 9 | 1 |

What is claimed is:

1. Rubbers or rubber blends vulcanizable using peroxides or mixed peroxy and ionic vulcanizing systems having improved properties of detachability from a mold after vulcanization and improved processability properties, consisting essentially of, as a processing adjuvant, a perfluorinated additive introduced in the form of an aqueous dispersion into the starting elastomer polymerization latex, said perfluorinated additive remaining in the rubber in the subsequent vulcanization step and being selected from the following classes:

a) Perfluoropolyethers having perfluoroalkyl end groups with a molecular weight ranging from 500 to about 1,500 in an amount ranging from 0.5 parts by weight to 3 parts by weight per hundred parts by weight of the elastomer;

b) Polytetrafluoroethylene prepared in aqueous dispersion and having a molecular weight lower than about 200,000, in an amount ranging from 1 to 10 parts by weight per 100 parts of elastomer and wherein the perfluoropolyether additives are selected from the following classes:

where $R_f$ and $R'_f$ are as indicated in class (1), and m, n, p and o have such values as to meet the above-indicated requirements;

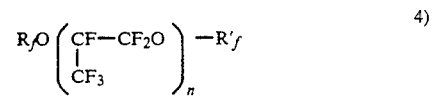

where $R_f$ or $R'_f$, alike or different from each other, are $-C_2F_5$ or $-C_3F_7$, and n has such a value as to meet the above-indicated average molecular weight requirements;

5) $R_fO(CF_2CF_2O)_nR'_f$, where $R_f$ and $R'_f$, alike or different from each other, are $-CF_3$, $-C_2F_5$, and n has such an average value as to meet the above-indicated average molecular weight requirements;

6) $R_fO(CF_2CH_2CF_2O)_nR'_f$, where $R_f$ and $R'_f$, alike or different from each other, are $-CF_3$ or $-C_2F_5$ or $-C_3F_7$ with n having such an average value as to meet the above-indicated average molecular weight requirements.

2. Rubbers or rubber blends vulcanizable using peroxides or mixed peroxy and ionic vulcanizing systems having improved properties of detachability from the mold after vulcanization and of processability, consisting essentially of, as a processing adjuvant, perfluorinated additive introduced in aqueous dispersion into the starting elastomer polymerization latex, said perfluorinated additive remaining in the rubber in the subsequent vulcanization step and being a mixture of the components belonging to the following classes:

a) Perfluoropolyethers having perfluoroalkyl end groups with a molecular weight ranging from 500 to about 1,000 in an amount ranging from 0.5 parts by weight to 3 parts by weight per hundreds parts by weight of elastomer;

b) Polytetrafluoroethylene prepared in aqueous dispersion, having a molecular weight lower than about 200,000, in an amount ranging from 1 to 10 parts by weight for hundred parts of elastomer and wherein the perfluoropolyether additives are selected from the following classes:

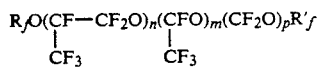

with a random distribution of the perfluorooxyalkylene units, where $R_f$ and $R'_f$, alike or different from each other, are $-CF_3$, $-C_2F_5$, $-C_3F_7$, $-CF_2H$, and m, n, p have such average values as to meet the above average molecular weight requirements, 2) $R_fO(CF_2CF_2O)_n(CF_2O)_mR'_f$, with a random distribution of the perfluorooxyalkylene units, where $R_f$ and $R'_f$ alike or different from each other, are $-CF_3$ or $-C_2F_5$, and m and n have such values as to meet the above average molecular weight requirements;

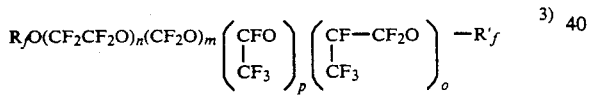

where $R_f$ and $R'_f$ are as indicated in class (1), and m, n, p and o have such values as to meet the above-indicated requirements;

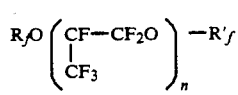

where $R_f$ or $R'_f$, alike or different from each other, are $-C_2F_5$ or $-C_3F_7$, and n has such a value as to meet the above-indicated average molecular weight requirements;

5) $R_fO(CF_2CF_2O)_nR'_f$, where $R_f$ and $R'_f$, alike or different from each other, are $-CF_2$, $-C_2F_5$, and n has such an average value as to meet the above-described-indicated average molecular weight requirements;

6) $R_fO(CF_2CF_2CF_2O)_nR'_f$, where $R_f$ and $R'_f$, alike or different from each other, are $-CF_3$ or $-C_2F_5$ or $-C_3F_7$ with n having such an average value as to meet the above-indicated average molecular weight requirements.

3. The rubber or rubber blends of claim 1 or 2, wherein the perfluoropolyether additives are introduced into the polymerization latex in the form of microemulsions.

4. The rubbers or rubber blends of claim 1 or 2, wherein the polytetrafluoroethylene additives are characterized by a crystallization $\Delta H > 13$ cal/g.

5. The vulcanizable rubbers or rubber blends of claim 1 or 2, wherein the elastomer is selected from the following:

(a) fluoroelastomeric copolymers of $CH_2=CF_2$ with $C_3F_6$, optionally containing $C_2F_4$;

(b) copolymers of $C_2F_4$ with propylene;

(c) fluoroelastomeric copolymers of $C_2F_4$ with perfluoroalkylperfluorovinylethers;

(d) fluoroelastomeric terpolymers of $C_3F_6$, $CH_2=CF_2$ and a perfluoroalkylperfluorovinylether;

(a), (c) and (d) containing peroxy cure sites;

6. Vulcanizable rubbers or rubber blends of claim 1 or 2, wherein a mixture of a fluroelastomer based on $CH_2=CF_2$ and of an elastomeric copolymer $C_2F_4/C_3H_6$ is utilized as an elastomer.

7. Process for obtaining vulcanized rubbers endowed with improved properties of detachability from the mold after vulcanization using peroxides or mixed peroxy and ionic vulcanizing systems, consisting essentially of:

A) dispersing in rubber polymerization latex a perfluorinated additive selected from at least one of the following classes:

a) perfluoropolyethers in the form of a micro emulsion with water, said perfluoropolyethers having non-brominated perfluoroalkyl and groups and a molecular weight ranging from 500 to about 1500, in an amount ranging from 0.5 to 3 parts by weight per hundred parts by weight of the rubber, said perfluoropolyethers being selected from the following classes:

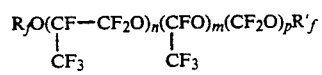

with a random distribution of the perfluorooxyalkylene units, where $R_f$ and $R'_f$, alike or different from each other, are $-CF_3$, $-C_2F_5$, $-C_3F_7$, $-C_3F_7$, $-CF_2H$, and m, n, p have such average values as to meet the above average molecular weight requirements;

2) $R_fO(CF_2CF_2O)_n(CF_2O)_mR'_f$, with a random distribution of the perfluorooxyalkylene units, where $R_f$ and $R'_f$ alike or different from each other, are $-CF_3$ or $-C_2F_5$, and m and n have such values as to meet the above average molecular weight requirements;

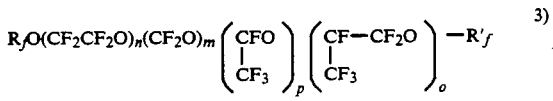

where $R_f$ and $R'_f$ are as indicated in class (1), and m, n, p and o have such values as to meet the above-indicated requirements;

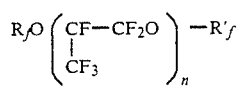

where $R_f$ or $R'_f$, alike or different from each other, are $-C_2F_5$ or $-C_3F_7$, and n has such a value as to meet the above-indicated average molecular weight requirements;

5) $R_fO(CF_2CF_2O)_nR'_f$, where $R_f$ and $R'_f$, alike or different from each other, are $-CF_3$, $-C_2F_5$, and n has such an average value as to meet the above indicated average molecular weight requirements;

6) $R_fO(CF_2CF_2CF_2O)_nR'_f$, where $R_f$ and $R'_f$ alike or different from each other, are $-CF_3$ or $-C_2F_5$ or $-C_3F_7$ with n having such an average value as to meet the above-indicated average molecular weight requirements, b) polytetrafluoroethylene prepared in aqueous emulsion and having a molecular weight lower than about 200,000, in an amount ranging from 1 to 10 parts by weight per 100 parts of elastomer;

B) coagulating the resulting latex;

C) adding to the resulting polymeric product the peroxy or mixed peroxy-ionic vulcanizing system; and D) vulcanizing the thus obtained product.

8. The process of claim 7, wherein the polytetrafluoroethylene additives are characterized by a crystallization $\Delta H > 13$ cal/g.

9. The process of claim 7, wherein the elastomer is selected from the following:
(a) fluoroelastomeric copolymers of $CH_2=CF_2$ with $C_3F_6$, optionally containing $C_2F_4$;
(b) copolymers of $C_2F_4$ with propylene;
(c) fluoroelastomeric copolymers of $C_2F_4$ with perfluoroalkylper
(d) fluoroelastomeric terpolymers of $C_3F_6$, $CH_2=CF_2$ and a perfluoroalkylperfluorovinylether;
(a), (c) and (d) containing peroxy cure sites.

10. The process of claim 7, wherein a mixture of a fluoroelastomer based on $CH_2=CF_2$ and of an elastomeric copolymer $C_2F_4/C_3H_6$ is utilized as an elastomer.

* * * * *